US012741367B2

(12) United States Patent
Alwisy

(10) Patent No.: US 12,741,367 B2
(45) Date of Patent: Sep. 22, 2026

(54) FRAMING AND INSTALLATION ROBOTIC SYSTEMS AND METHODS

(71) Applicant: University of Florida Research Foundation, Inc., Gainesville, FL (US)

(72) Inventor: Aladdin Alwisy, Gainesville, FL (US)

(73) Assignee: University of Florida Research Foundation, Inc., Gainesville, FL (US)

( * ) Notice: Subject to any disclaimer, the term of this patent is extended or adjusted under 35 U.S.C. 154(b) by 7 days.

(21) Appl. No.: 18/835,450

(22) PCT Filed: Feb. 2, 2023

(86) PCT No.: PCT/US2023/061826
§ 371 (c)(1),
(2) Date: Aug. 2, 2024

(87) PCT Pub. No.: WO2023/150603
PCT Pub. Date: Aug. 10, 2023

(65) Prior Publication Data

US 2025/0135633 A1 May 1, 2025

Related U.S. Application Data

(60) Provisional application No. 63/306,566, filed on Feb. 4, 2022.

(51) Int. Cl.
*B25J 15/00* (2006.01)
*B25J 9/00* (2006.01)
*B25J 11/00* (2006.01)

(52) U.S. Cl.
CPC ......... *B25J 9/0087* (2013.01); *B25J 11/0075* (2013.01)

(58) Field of Classification Search
CPC .. B25J 9/0087; B25J 11/0075; B25J 15/0066; B25J 15/0616
(Continued)

(56) References Cited

U.S. PATENT DOCUMENTS 5,979,787 A 11/1999 Scarpa
8,550,765 B2 * 10/2013 Cottone ............... B65G 49/067 414/744.3

(Continued)

FOREIGN PATENT DOCUMENTS

CN 110733049 A 1/2020

OTHER PUBLICATIONS

Zhao et al. (CN110733049); Processing system capable of realizing automatic replacement of end effectorsin mechanical arm. MH Robot & Automation Co Ltd (Year: 2020).*

(Continued)

*Primary Examiner* — B M M Hannan
(74) *Attorney, Agent, or Firm* — Thomas | Horstemeyer, LLP

(57) ABSTRACT

A multifunctional end effector robotic system of the present disclosure comprises a mounting plate of a multifunctional end effector that is configured to couple to an arm of a robot; and a plurality of functional components of the multifunctional end effector. The plurality of functional components comprises a work piece holding assembly that is configured to perform clamping or suction actions to a work piece; a fastener gun component that is configured to attach a fastener to a work piece; and/or a spray component that is configured to perform spraying or extruding of materials on a work piece. The multifunctional end effector robotic system further comprises a power control box of the multifunctional end effector that is configured to supply power to the plurality of functional components. Other systems and methods are also provided.

20 Claims, 12 Drawing Sheets

(58) Field of Classification Search
USPC ........................................................ 700/248
See application file for complete search history.

(56) References Cited

U.S. PATENT DOCUMENTS

| | | | | |
|---|---|---|---|---|
| 9,498,887 | B1 * | 11/2016 | Zevenbergen | B25J 15/0052 |
| 10,717,187 | B2 | 7/2020 | Iqtidar et al. | |
| 2015/0086939 | A1 * | 3/2015 | Fisker | A61C 13/083<br>433/29 |
| 2016/0271791 | A1 | 9/2016 | Schultz | |
| 2016/0288322 | A1 * | 10/2016 | Lin | B25J 15/0616 |
| 2017/0203443 | A1 | 7/2017 | Lessing et al. | |
| 2017/0282202 | A1 * | 10/2017 | Lim | B25J 9/1664 |
| 2018/0029227 | A1 | 2/2018 | Linnell et al. | |
| 2018/0370043 | A1 * | 12/2018 | Hashimoto | B25J 15/0019 |
| 2020/0256051 | A1 * | 8/2020 | Becerril Hernández | E04B 1/18 |
| 2020/0269373 | A1 * | 8/2020 | Pieger | B22F 10/28 |
| 2021/0094190 | A1 * | 4/2021 | Luo | B25J 15/0625 |
| 2021/0197399 | A1 * | 7/2021 | Gupta | B25J 15/0233 |
| 2022/0055112 | A1 * | 2/2022 | Torabi | B28B 1/001 |
| 2022/0088799 | A1 * | 3/2022 | Gao | B62D 65/022 |
| 2022/0097420 | A1 * | 3/2022 | Hiller | B41J 2/2114 |
| 2022/0245930 | A1 * | 8/2022 | Pierce | G06V 20/64 |
| 2023/0103030 | A1 * | 3/2023 | Chevron | B25J 11/0075<br>700/30 |
| 2023/0211558 | A1 * | 7/2023 | Sherehiy | B29C 64/25<br>414/749.1 |
| 2023/0226695 | A1 * | 7/2023 | Ames | E04C 2/24 |
| 2024/0375281 | A1 * | 11/2024 | Ames | B25J 9/163 |

OTHER PUBLICATIONS

International Search Report and Written Opinion mailed on Jun. 16, 2023 for PCT Patent Application No. PCT/US2023/061826. (Copy Provided).

* cited by examiner 110 (FIG. 1)

110
Multifunctional Framing End-Effector
The location of nail gun and gripper in the same direct, perpendicular to the mounting plate, allows for greater flexibility in the framing and nailing tasks
Grippers (202)
Spray Extender (214)
Pneumatic Box (212)
Mounting Plate (210)
240
Nail Gun Rotation Direction
230
212
226
232
222
220
204
Nail Gun (204)
Linear Actuator (Nail Gun (208) Extender)
Nail Gun Anchoring System (206)
228
224

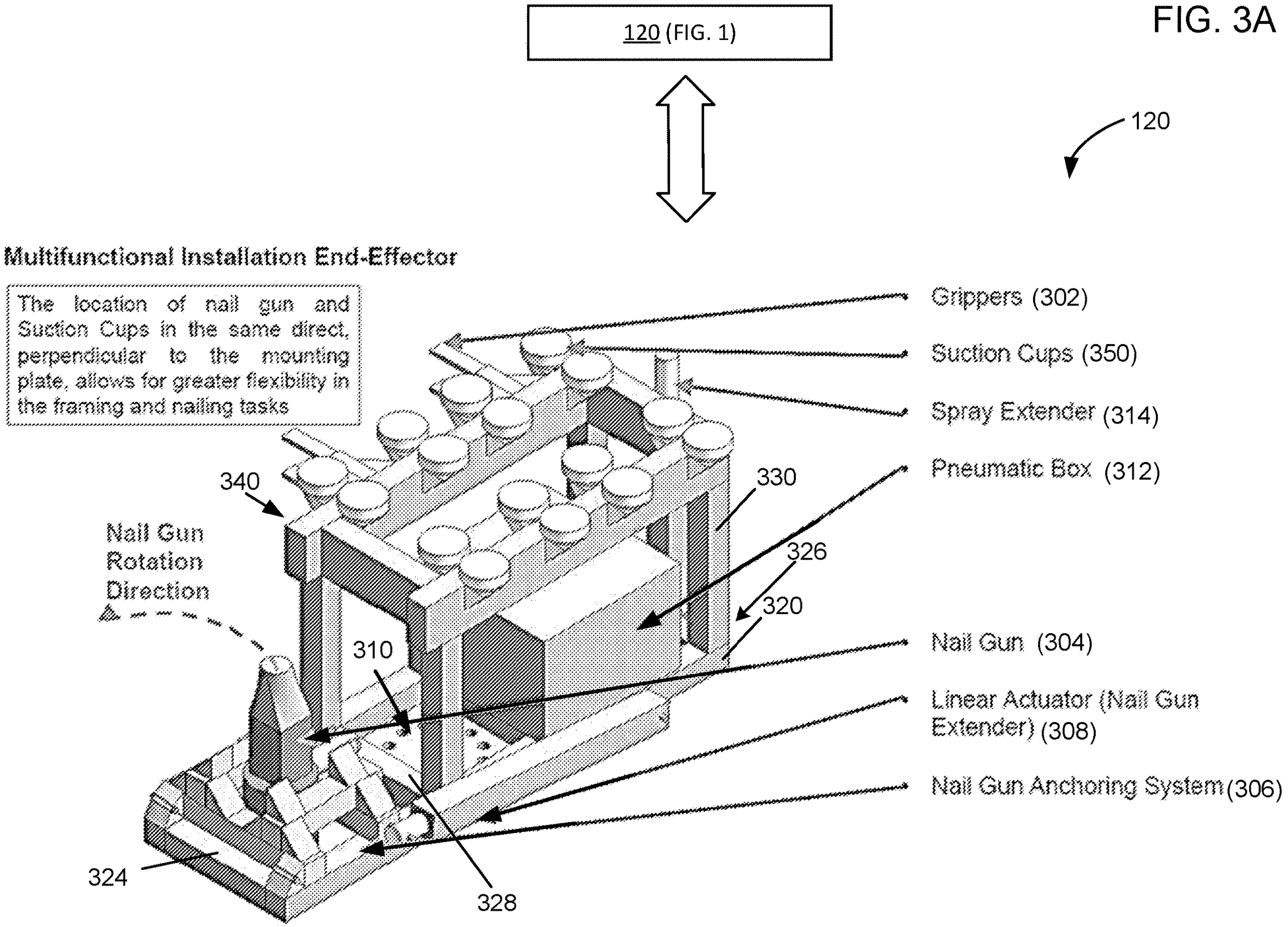

FIG. 3A
120 (FIG. 1)
120
Multifunctional Installation End-Effector
The location of nail gun and Suction Cups in the same direct, perpendicular to the mounting plate, allows for greater flexibility in the framing and nailing tasks
Grippers (302)
Suction Cups (350)
Spray Extender (314)
Pneumatic Box (312)
Nail Gun (304)
Linear Actuator (Nail Gun Extender) (308)
Nail Gun Anchoring System (306)
340
330
326
320
Nail Gun Rotation Direction
310
324
328

120 (FIG. 1)
120
Multifunctional Installation End-Effector
The location of Grippers allows the end effector to grab top/bottom plates to support the framing station.
340
Nail Gun Rotation Direction
302
Spray Extender * (314)
Suction Cups * (350)
Grippers * (302)
Pneumatic Box * (312)
310
330
322
Nail Gun (304)
Linear Actuator (Nail Gun Extender) (308)
Nail Gun Anchoring System (306)

FRAMING AND INSTALLATION ROBOTIC SYSTEMS AND METHODS

CROSS-REFERENCE TO RELATED APPLICATIONS

This application is the 35 U.S.C. § 371 national stage application of International Application No. PCT/US2023/061826, filed Feb. 2, 2023, which claims priority to U.S. provisional application entitled, "Framing and Installation Robotic Systems and Methods," having Ser. No. 63/306,566, filed Feb. 4, 2022, which is entirely incorporated herein by reference.

TECHNICAL FIELD

The present disclosure is generally related to robotic systems for construction applications.

BACKGROUND

Robotic systems improve the speed, accuracy, safety, and reliability with which such procedures are performed and are suitable for integration into construction projects. For existing robotic systems used in the construction industry, a series of robots are typically used to perform various construction tasks where each robot is equipped with an end effector that is adapted to perform a single task, such as nailing or grabbing/moving materials in position. However, since single robots (having a movable arm) are expensive, employing series of robots significantly increases costs and also complicates the job more than is necessary.

SUMMARY

Embodiments of the present disclosure provide novel multifunctional end effector robotic systems and related methods. One such system comprises a mounting plate of a multifunctional end effector that is configured to couple to an arm of a robot; and a plurality of functional components of the multifunctional end effector. Accordingly, the plurality of functional components comprise a work piece holding assembly that is configured to perform clamping or suction actions to a work piece; a fastener gun component that is configured to attach a fastener to a work piece; and/or a spray component that is configured to perform spraying or extruding of materials on a work piece. The system further comprises a power control box of the multifunctional end effector that is configured to supply power to the plurality of functional components.

The present disclosure can also be viewed as a novel multifunctional end effector robotic method. In this regard, one embodiment of such a method, among others, can be broadly summarized by coupling a multifunctional end effector to an arm of a robot, wherein the multifunctional end effector equipped with a plurality of functional components comprising a work piece holding assembly, a fastener gun, and a spray component; performing clamping or suction actions to a work piece using the work piece holding assembly of the multifunctional end effector; attaching a fastener to the work piece using the fastener gun of the multifunctional end effector; and spraying or extruding of materials on the work piece using the spray component of the multifunctional end effector.

In one or more aspects for such systems and/or methods, the fastener gun component comprises a nail gun or a screw gun; the work piece holding assembly comprises a gripper assembly having at least two grippers that are configured to perform clamping actions to a work piece; the fastener gun component of the multifunctional end effector is pointed in a same perpendicular direction as the at least two grippers of the gripper assembly of the multifunctional end effector, wherein the perpendicular direction is relative to the mounting plate; the spray component is coupled to a linear actuator that is configured to extend the spray component in a same direction as the gripper assembly and the fastener gun component are pointed; the work piece holding assembly comprises a suction cup assembly having a plurality of suction cups that are configured to hold and release the work piece by performing suction actions; the fastener gun component of the multifunctional end effector is pointed in a same perpendicular direction as the suction cups of the suction cup assembly of the multifunctional end effector, wherein the perpendicular direction is relative to the mounting plate; the spray component is coupled to a linear actuator that is configured to extend the spray component in a same direction as the suction cup assembly and the fastener gun component are pointed; the fastener gun component is coupled to one or more linear actuators that are configured to extend the fastener gun component in an axial direction away from an end of the multifunctional end effector; the spray component is equipped to spray paint; the fastener gun component is configured to be movable in an angular rotation with respect to an end of the multifunctional end effector; the spray component is equipped to perform 3D printing extrusion; the spray component is equipped to spray foam materials; and/or the power control box comprises a pneumatic power control box, a hydraulic power control box, or an electric power control box.

In one or more aspects, such systems and/or methods may further comprise a gripper assembly of the multifunctional end effector that is pointed in a perpendicular direction with respect to a direction that the suction cups of the suction cup assembly of the multifunctional end effector are pointed; a computer control system that is configured to send control commands to the robot, wherein the computer control system comprises a control for toggling between automatic and manual control of the multifunctional end effector; a second robot equipped with the multifunctional end effector, wherein the computer control system is configured to send control commands for completing a construction project to the robot and the second robot; and/or an automatic feeder mechanism to supply work piece materials to the robot.

Other systems, methods, apparatuses, features, and advantages of the present disclosure will be or become apparent to one with skill in the art upon examination of the following drawings and detailed description. It is intended that all such additional systems, methods, features, and advantages be included within this description and be within the scope of the present disclosure.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the present invention. Moreover, in the drawings, like reference numerals designate corresponding parts throughout the several views.

FIGS. 3A and 3B provide frontside and backside perspective views of an exemplary installation multifunctional end effector mechanism in accordance with various embodiments of the present disclosure.

DETAILED DESCRIPTION

It would be desirable to have robotic systems and methods for performing construction framing and installation procedures that avoid drawbacks of existing systems and methods. Disclosed herein are examples of such systems and methods. In the following disclosure, various specific embodiments are described. It is to be understood that those embodiments are example implementations of the disclosed inventions and that alternative embodiments are possible. Such alternative embodiments include hybrid embodiments that include features from different disclosed embodiments. All such embodiments are intended to fall within the scope of this disclosure.

Disclosed herein are robotic systems based on advanced mechatronic technology for use in construction projects, such as but not limited to framing and/or installation procedures. The robotic systems improve the speed, accuracy, safety, and reliability with which such procedures are performed and are suitable for integration into construction projects. For existing robotic systems used in the construction industry, a series of robots are typically used to perform various construction tasks where each robot is equipped with an end effector that is adapted to perform a single task, such as nailing or grabbing/moving materials in position. However, since single robots (having a movable arm) are expensive, employing series of robots significantly increases costs and also complicates the job more than is necessary.

Figure 1:
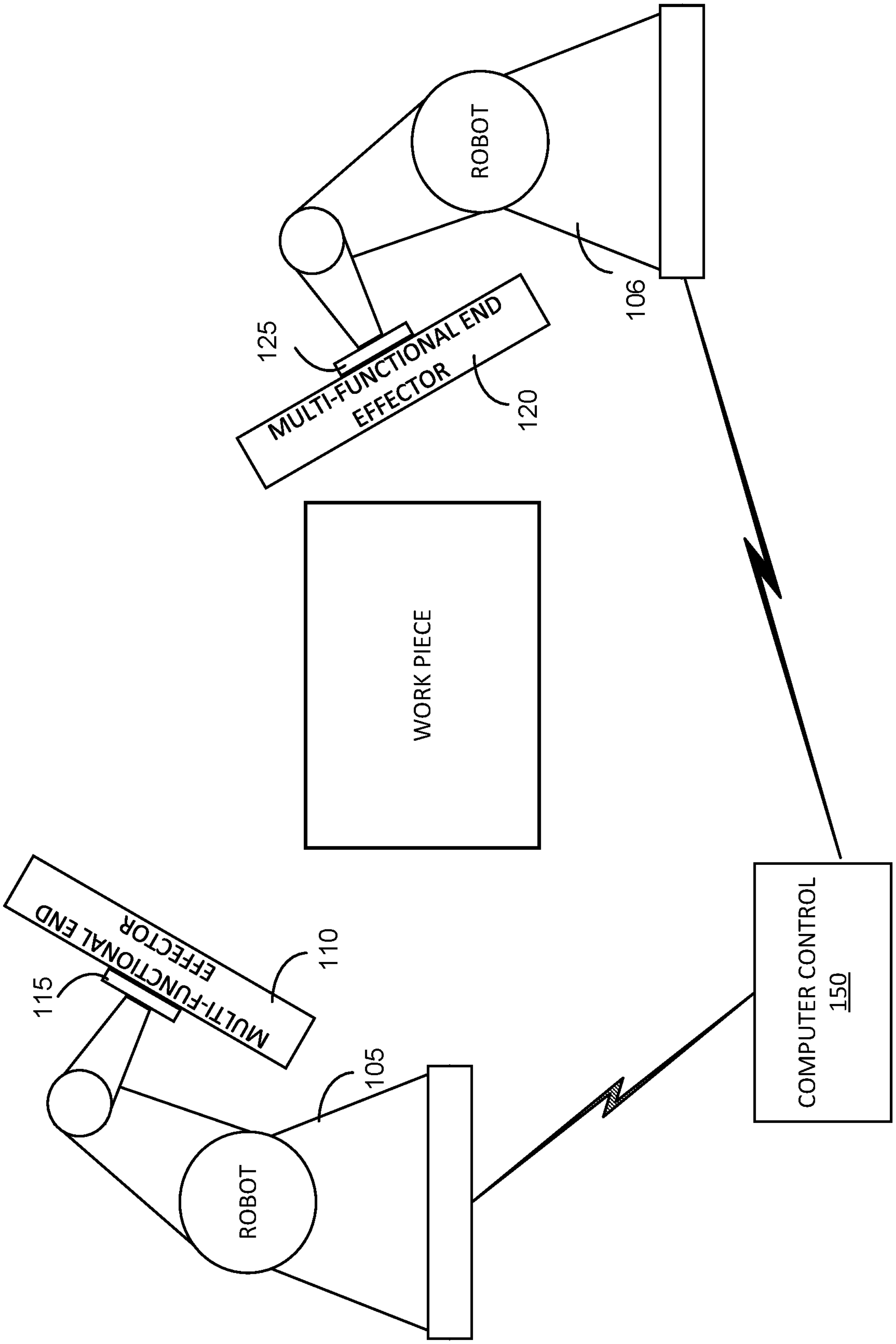
FIG. 1 shows an exemplary robotic system having a robot with a multifunctional end effector in accordance with various embodiments of the present disclosure.

Referring to FIG. 1, in various embodiments, an exemplary robotic system includes at least one robot having a movable arm that is equipped with a multifunctional end effector. In the non-limiting example of FIG. 1, two robots 105, 106 are provided with individual multifunctional end effectors 110, 120. In accordance with various embodiments, the multifunctional end effector 110 for robot 105 may be configured to perform different functions or tasks than the multifunctional end effector 120 for robot 106, may be configured to perform the same functions as the multifunctional end effector 120 for robot 106, or may be configured to perform certain functions that are similar to those of the multifunctional end effector 120 of robot 106. While a similar functionality may be performed by respective end effectors 110, 120, their configuration may be varied such that end effector component is aligned in a different direction as compared to the similar end effector component of another end effector. Additionally, while the multifunctional end effector 110 is shown coupled to robot 105, the respective multifunctional end effectors are configured to be removable and/or securable to a variety of different robots via an adaptor plate 115 of the respective robot and the mounting plate 210 (FIG. 2A) of the multifunctional end effector. Accordingly, the multifunctional end effector 110 can be removed from the adapter plate 115 of the robotic arm of robot 105 and affixed to the adapter plate 125 of the robotic arm of robot 106.

An exemplary robotic system may further include a computer control system 150 that is communicatively coupled to a respective robot 105, 106, where the robot can include one or more sensors or sensing devices, which can include imaging devices or other sensors (e.g., laser device), that provide feedback data from application of the robot and the multifunctional end effector tools. A sensor system may be comprised of any number of individual sensor systems, sensor devices, controllers, other types of components, or combination thereof, whereby the sensor system may be used to coordinate the movement and operation of the various robots within a manufacturing environment. Accordingly, a control system 150 can provide commands to the robotic platform to guide operation of the multifunctional end effector mechanism. Such commands can be based on inputs provided from sensing data from the one or more sensors of the robotic platform. The control system 150 may utilize electrical and/or mechanical controls, including pneumatic, electrical, and/or hydraulic controls—differential pressure and/or expansion—to actuate elements of the applicable end effector mechanism, in various embodiments. The computation or determination of the platform commands can be provided by a computer processor that implements artificial intelligence models, such as fuzzy logic techniques, in accordance with various embodiments of the present disclosure.

In some embodiments, a framing multifunctional end effector mechanism 110 of an exemplary robotic system is specifically configured for use in construction framing procedures. In such cases, the robotic system enables accurate placement of wood or metal components of a construction frame (e.g., wall frame, roofing frame, floor frame, etc.) without the need for multiple ancillary devices or personnel. In addition, the systems enable the ability for fastening the wood/metal components to one another (e.g., via a nail gun component, a screwing member, etc.).

Figure 2A:
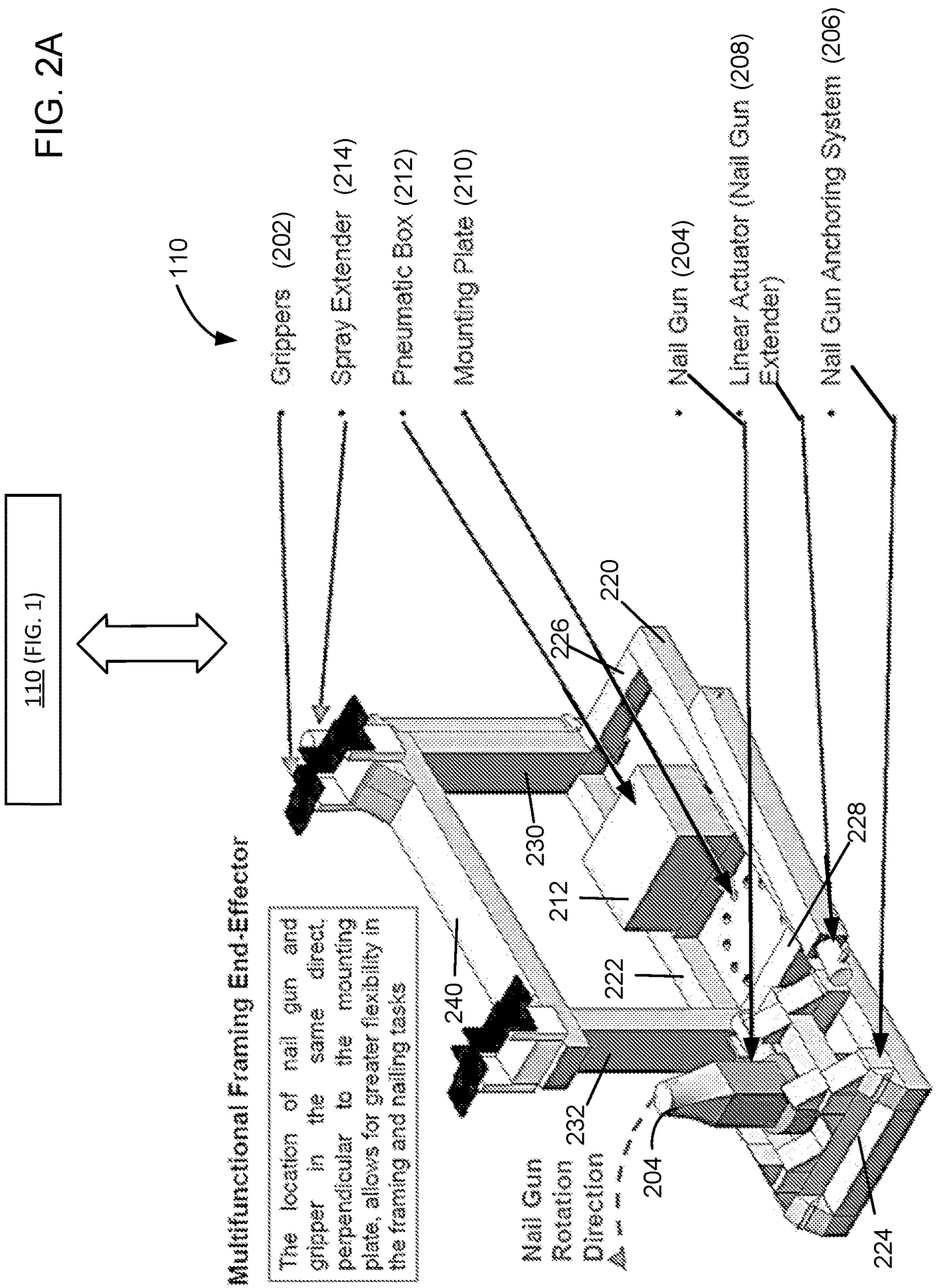
FIGS. 2A and 2B provide frontside and backside perspective views of an exemplary framing multifunctional end effector mechanism in accordance with various embodiments of the present disclosure.
Figure 2B:
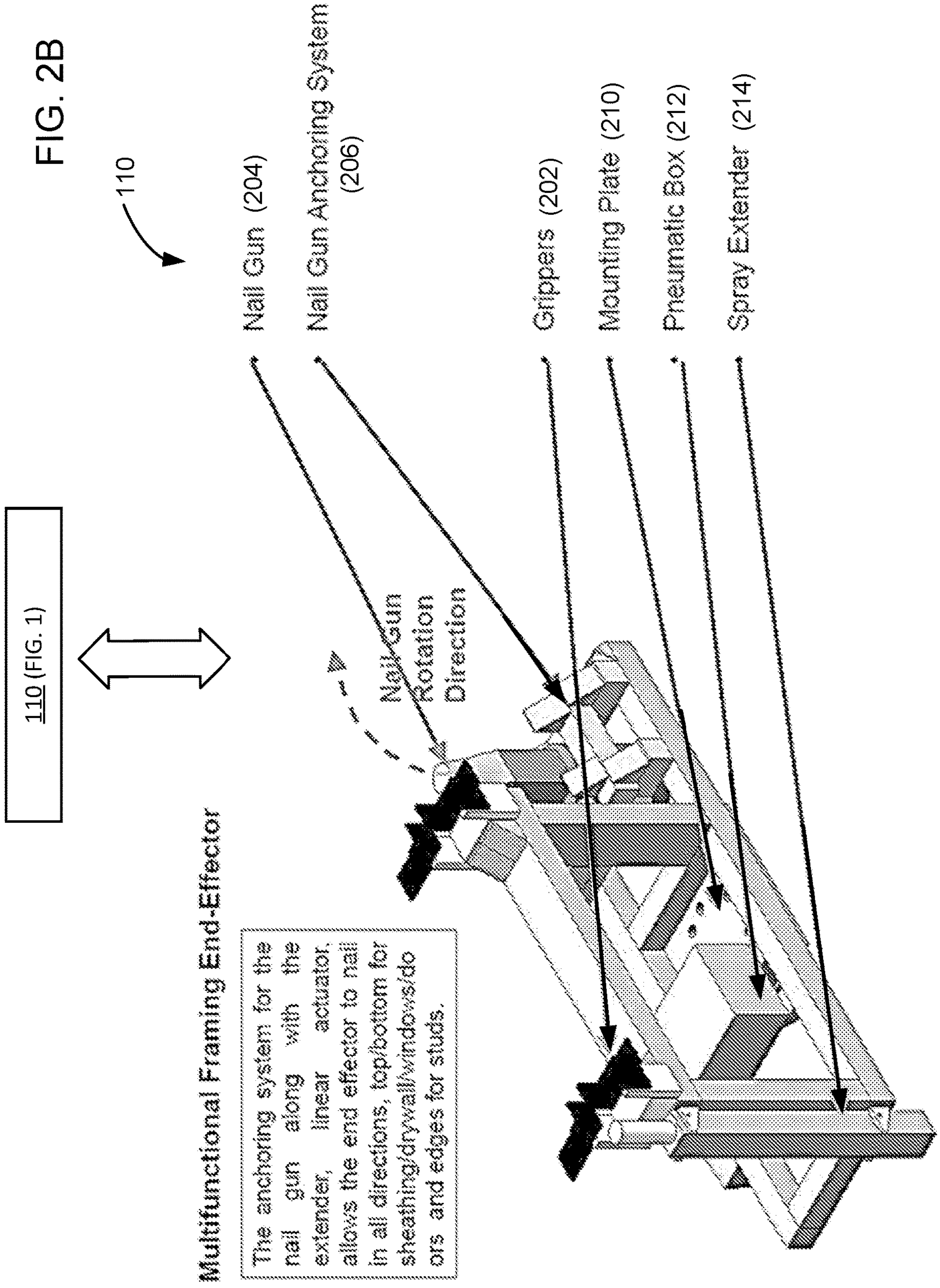

Referring now to FIGS. 2A and 2B, frontside and backside perspective views of an exemplary framing multifunctional end effector mechanism 110 is provided. Here, the framing multifunctional end effector mechanism 110 contains a work piece holding assembly in the form of two gripper components 202 that are configured to hold onto a wood stud or metal track as they act in concert to grab onto the wood/metal/work piece and move the piece into proper positioning before disengaging and releasing the work piece. In an illustrative example, the gripper component 202 may comprise a clamping device having a first part that press against a second part. Accordingly, a first force may be applied against the first part and a second force may be applied against the second part, such that the first force and the second force hold the first part and the second part together in place relative to each other.

Accordingly, the framing multifunctional end effector mechanism 110 can be rotated and moved via the robot arm to position a fastener gun component 204 (e.g., nail gun, screw gun, rivet gun, etc.) to fasten the piece with another work piece of the frame assembly. Additionally, the fastener gun component 204 itself can also be rotated to allow for proper positioning of the fastener gun component (via a rotatable anchoring mechanism 206 that is configured to move the gun component in an angle of rotation towards/away-from an end of the base assembly) in order to achieve the desired attachment angle for the fastener (e.g., nail). Additionally, the fastener gun component 204 may be secured to one or more linear actuators/extenders 208 that can also move the fastener gun component 204 in an axial direction away from and towards the base assembly of the framing end effector mechanism 110. As such, the anchoring mechanism 206 and the linear actuator(s)/extender(s) 208 allow the end effector 110 to perform fastening operations in all directions, such as top/bottom for sheathing/drywall/windows/doors and sides/edges for studs/framing.

As shown in FIGS. 2A and 2B, in various embodiments, the framing multifunctional end effector mechanism 110 provides a power control box 212 (e.g., a pneumatic power control box, a hydraulic power control box, electric power control box, etc.) to power one or more effector interfaces, such as the fastener gun component. Additionally, the framing effector mechanism provides a mounting plate 210 to attach or couple the effector to the robot arm. As such, the framing multifunctional end effector mechanism 110 includes parallel longitudinal frame components 220, 222 that are coupled to and between two parallel end-lateral frame components 224, 226. Additionally, one or more middle-lateral frame components 228 may be coupled to and between the parallel longitudinal frame components 220, 222. A bottom surface of the parallel longitudinal frame components 220, 222 can be secured (e.g. welded or fastened) to the mounting plate 210 that is used to couple or fasten the end effector 110 to the robot arm. Parallel vertical member components 230, 232 are secured along a length of one of the parallel longitudinal frame components at junction points with the lateral frame components 226, 228. The vertical members are at least as long as the longest dimension in the fastener gun component (including the anchoring mechanism 206) so that the two grippers 202 are positioned above the gun and can pick up wood/steel/work pieces without any obstruction. At a top of the parallel vertical member components 230, 232, a horizontal bar component 240 is secured having the two gripper elements 202, where the gripper elements are coupled with the power control box 212 such that the gripper elements 202 may be actuated based on command signals received by the power control box 212 from the computer control system 150. In various embodiments, a length of the bar component 240 does not extend over or above the fastener gun component 204, as shown in FIG. 2A. Accordingly, the fastener gun (e.g., nail gun) and the gripper(s) 202 may be oriented in a same perpendicular or orthogonal direction with respect to the mounting plate which allows for greater flexibility in framing and fastening (e.g., nailing) tasks given that the gripper assembly 202 does not interfere with the fastening function of the fastener gun component 204.

Figure 2C:
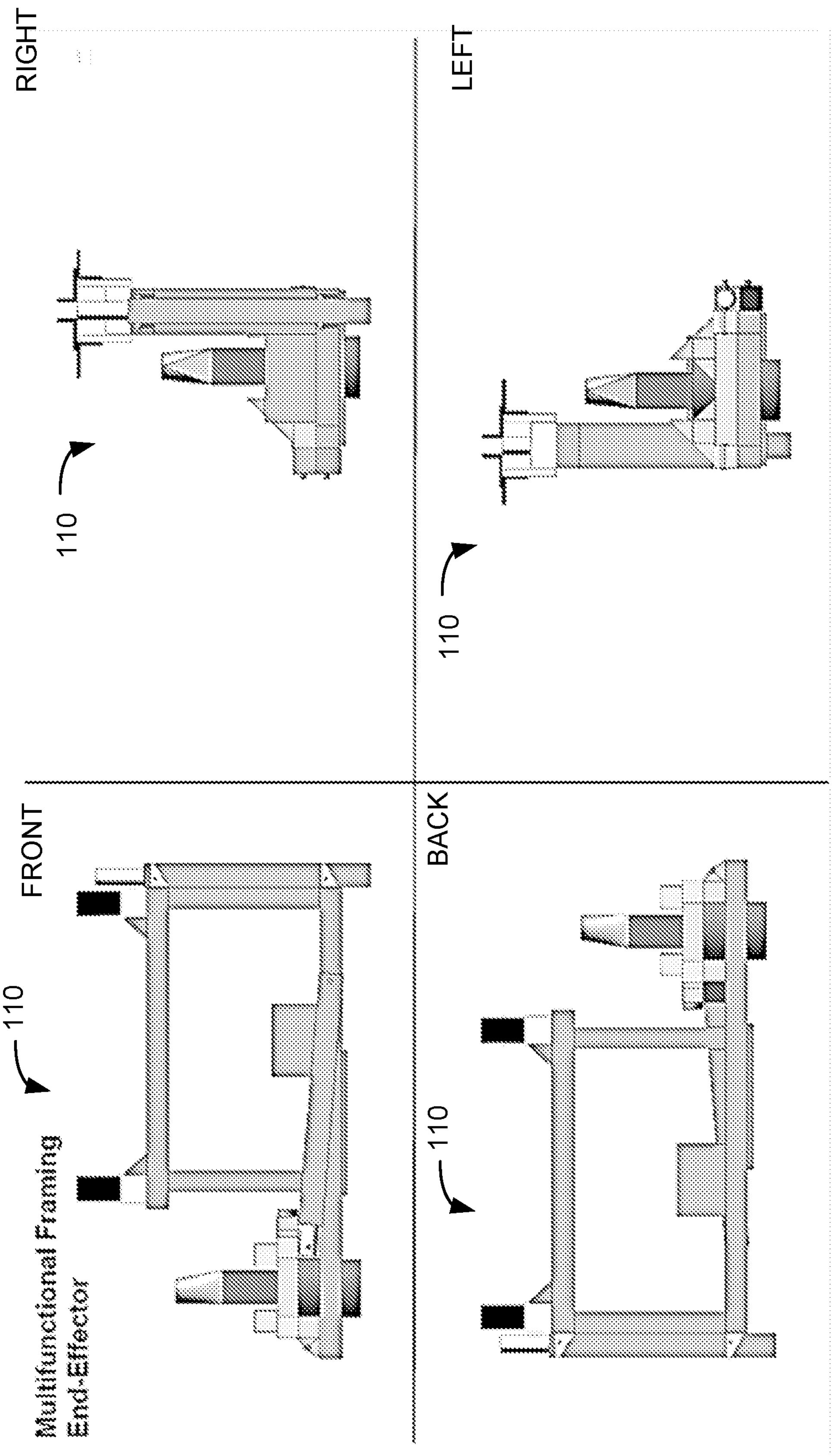
FIG. 2C provides front, right, left, and back views (moving in a clockwise direction) of the exemplary framing multifunctional end effector mechanism of FIGS. 2A and 2B.

Correspondingly, the fastener gun assembly or other type of interface assembly can be coupled to the parallel longitudinal frame components 220, 222 via fasteners (e.g., screws) or other type of securing mechanism (e.g., welding) on a top surface of the frame components, as shown in FIG. 2A. Accordingly, in various embodiments, one or more linear actuators 208 can be secured to the fastener gun assembly 204 and a side of the frame components to allow for axial movement of the fastener gun assembly 204. Additionally, other types of interface assemblies may be secured to the end effector frame and engaged with the power control box 212 to allow for additional interface functionalit (ies). For example, a spray extender component 214 is shown in FIG. 2A, that is mounted to one of the vertical members 230, 232 at an opposite end of the end effector (with respect to a location of the fastener gun assembly 204). Accordingly, the spray extender 214 can be linear extended in a direction along an axial length of the vertical member 230, 232 (via a linear actuator). In various embodiments, the spray extender mechanism can be equipped to spray paint, foam, stains, preservatives, etc. or to be used for 3D printing extrusion, among other possible uses. For additional views, FIG. 2C provides front, right, left, and back views (moving in a clockwise direction).

In some embodiments, an installation multifunctional end effector mechanism 120 of an exemplary robotic system is specifically configured for use in construction installation procedures. In such cases, the robotic system enables the installation of two-dimensional construction components, such as OSB (oriented strand board) or plywood sheathing, drywalls, doors, windows, etc. without the need for multiple ancillary devices or personnel. In addition, the systems enable the ability for fastening the wood/metal components to one another (e.g., via a nail gun, a screw gun, etc.).

Figure 3B:
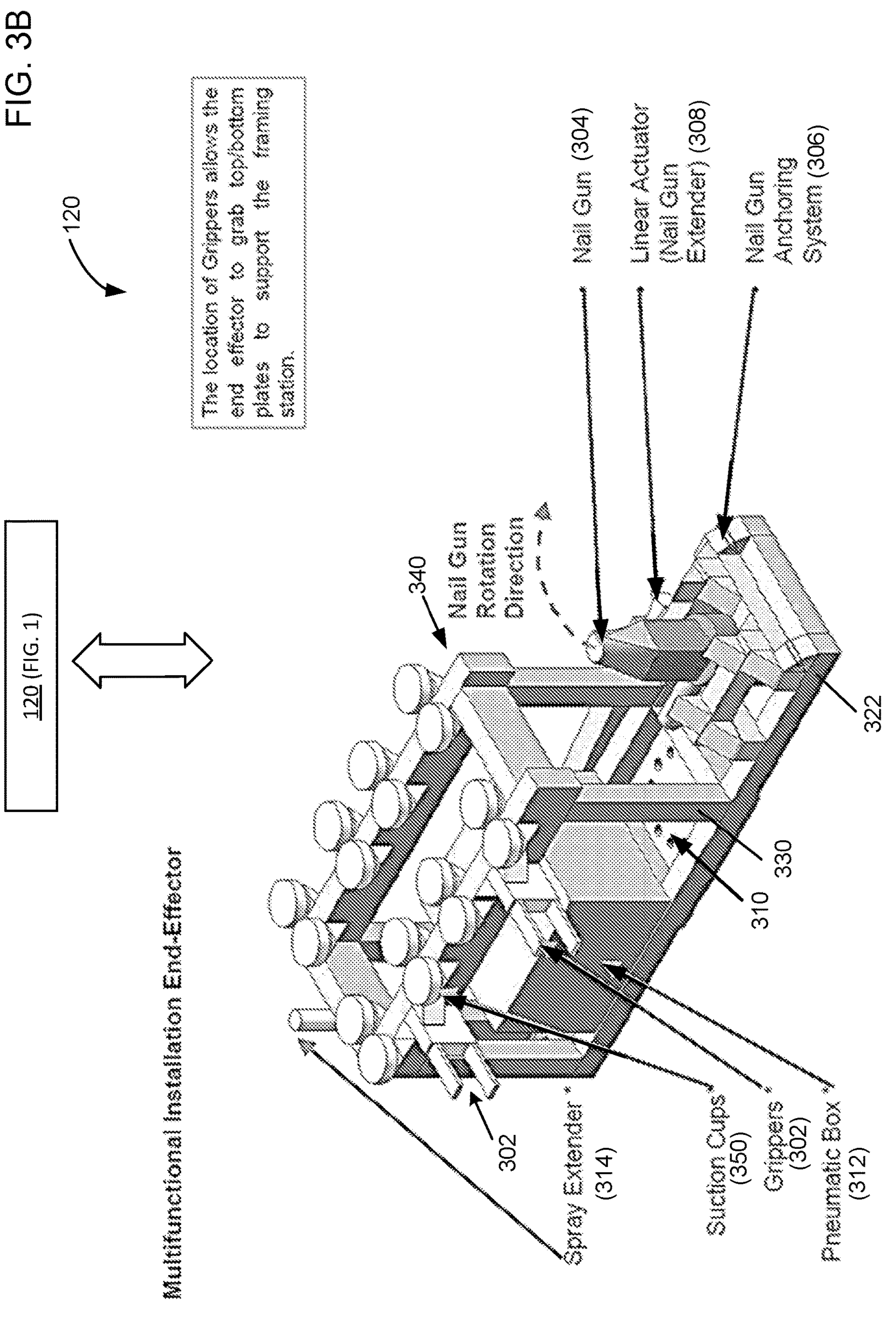

Referring now to FIGS. 3A and 3B, frontside and backside perspective views of an exemplary installation multifunctional end effector mechanism 120 are provided. Here, the installation multifunctional end effector mechanism 120 contains two gripper components 302 that are configured to hold onto a construction assembly, such as a top or bottom plate of a frame assembly, as the gripper elements act in concert to grab onto the wood/metal/work piece and move the piece into proper positioning before disengaging and releasing the work piece. Accordingly, the installation multifunctional end effector mechanism 120 can be rotated and moved via the robot arm to position a fastener gun component 304 (e.g., nail gun, screw gun, rivet gun, etc.) to fasten the piece with another work piece of the assembly. Additionally, the fastener gun component 304 itself can also be rotated and moved to allow for proper positioning of the fastener gun component (via a rotatable anchoring mechanism 306 that is configured to move the gun component in an angle of rotation towards/away-from an end of the base assembly) in order to achieve the desired attachment angle for the fastener (e.g., nail). Additionally, the fastener gun component 304 may be secured to one or more linear actuators/extenders 308 that can also move the fastener gun component 304 in an axial direction away from and towards the base assembly of the installation end effector mechanism 120. As such, the anchoring mechanism 306 and the linear actuator(s)/extender(s) 308 allow the end effector 120 to perform fastening operations in all directions. In various embodiments, limit switches or proximity sensors can be mounted next to each gripper that can be activated when a work piece is picked up thereby creating a closed-loop system for end-effector.

As shown in FIGS. 3A and 3B, in various embodiments, the installation multifunctional end effector mechanism 120 provides a power control box 312 (e.g., a pneumatic power control box, a hydraulic power control box, electric power control box, etc.) to power one or more effector interfaces, such as the fastener gun component. Additionally, the framing end effector mechanism provides a mounting plate 310 to attach or couple the effector to the robot arm. As such, the installation end effector mechanism 120 includes parallel longitudinal frame components 320, 322 that are coupled to and between two parallel end-lateral frame components 324, 326. Additionally, one or more middle-lateral frame components 328 may be coupled to and between the parallel longitudinal frame components 320, 322. A bottom surface of the parallel longitudinal frame components 320, 322 can be secured (e.g. welded or fastened) to the mounting plate 310 that is used to couple or fasten the end effector 120 to the robot arm. Parallel vertical member components 330 are secured along a length of both of the parallel longitudinal frame components 320, 322 at junction points with the lateral frame components (e.g., 4 junction points). The length of vertical member components 330 are at least equal to the longest dimension in the fastener gun component (including the anchoring mechanism 306) so that the suction cups 350 are above the gun and can pick up linear, two-dimensional, or volumetric wood/steel/work pieces without any obstruction.

At a top of the parallel vertical member components 330, a rectangular frame 340 is secured having a work piece holding assembly in the form of a plurality of suction cup elements 350, where the suction cup elements 350 are communicatively engaged with the power control box 312. As such, the suction cup elements 350 can be used to engage and grasp a flat structural element, such as a door, window, sheathing material, etc., via an actuated suction action that is facilitated by command signals received by the power control box 312 from the computer control system 150, and to move the structural element into position for installation within a construction project. The rectangular frame 340 may further feature two gripper components 302 that extend from a side of the rectangular frame and are configured to hold onto a construction work piece as they act in concert to grab onto the piece and move the piece into proper positioning before disengaging and releasing the work piece. Accordingly, in various embodiments, the gripper elements are coupled with the power control box 312 such that the gripper elements 302 may be actuated based on command signals received by the power control box 312 from the computer control system 150. In various embodiments, a length of the rectangle frame 340 and suction cup 350 assembly does not extend over or above the fastener gun component 304, as shown in FIGS. 3A-3B. Accordingly, the fastener gun 304 (e.g., nail gun) and the suction cups 350 may be oriented in a same perpendicular or orthogonal direction with respect to the mounting plate which allows for greater flexibility in installation and fastening (e.g., nailing) tasks given that the suction cup assembly does not interfere with the fastening function of the fastener gun component 304.

Correspondingly, the fastener gun assembly or other type of interface assembly can be coupled to the parallel longitudinal frame components 320, 322 via fasteners (e.g., screws) or other type of securing mechanism (e.g., welding) on a top surface of the frame components, as shown in FIGS. 3A-3B. Accordingly, in various embodiments, one or more linear actuators 308 can be secured to the fastener gun assembly 304 and a side of the frame components to allow for axial movement of the fastener gun assembly 304. Additionally, other types of interface assemblies may be secured to the end effector frame and engaged with the power control box 312 to allow for additional interface functionalit (ies). For example, a spray extender component

Figure 3C:
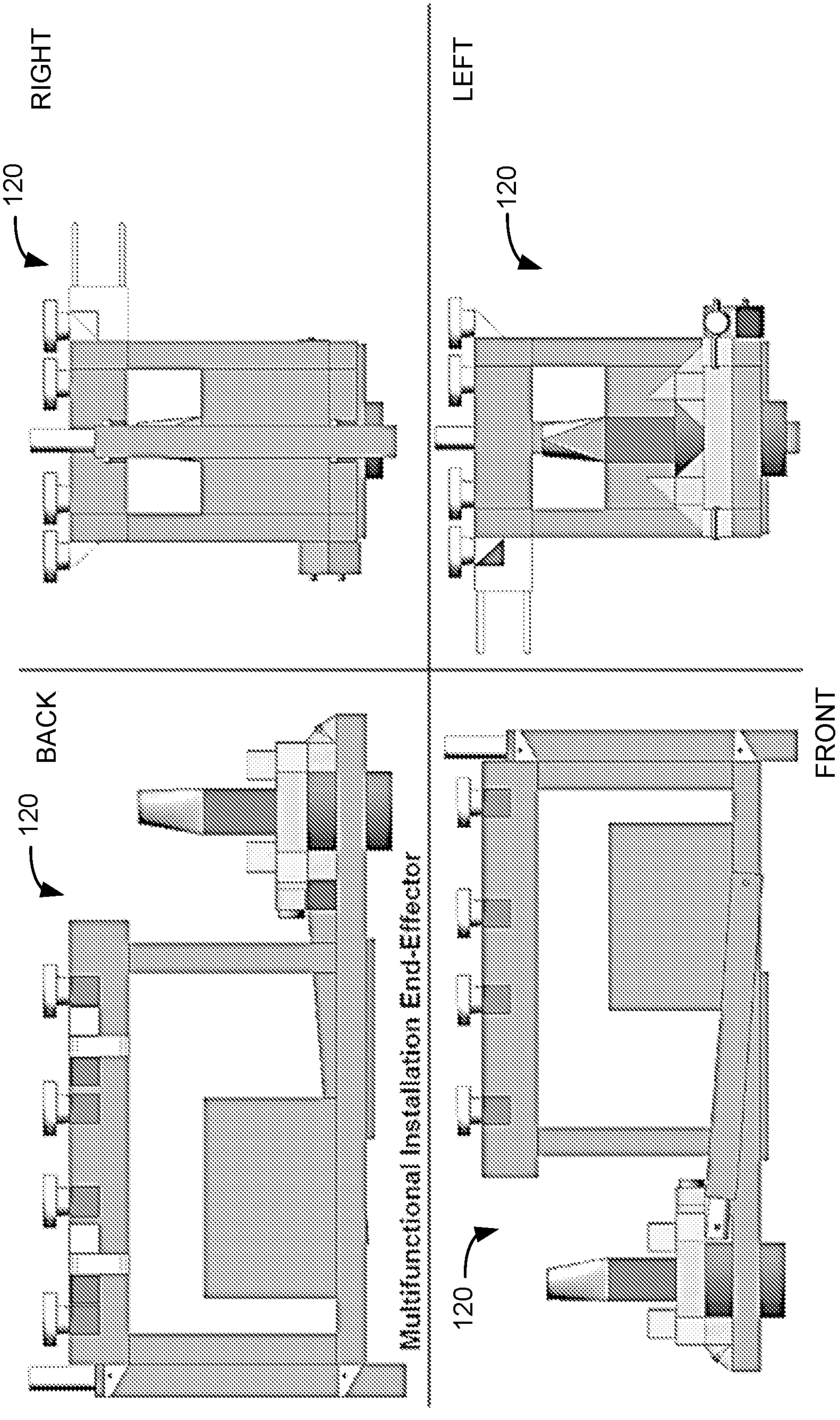
FIG. 3C provides back, right, left, and front views (moving in a clockwise direction) of the exemplary installation multifunctional end effector mechanism of FIGS. 3A and 3B.

314 is shown in FIGS. 3A-3B, that is mounted to one of the vertical members 330 at an opposite end of the end effector (with respect to a location of the fastener gun assembly 304). Accordingly, the spray extender 314 can be linear extended in a direction along an axial length of the vertical member 330 (via a linear actuator). In various embodiments, the spray extender mechanism can be equipped to spray paint, foam, stains, preservatives, etc. or to be used for 3D printing extrusion, among other possible uses. In various embodiments, limit switches or proximity sensors can be mounted next to each gripper that can be activated when a work piece is picked up thereby creating a closed-loop system for end-effector. Likewise, the limit switches or proximity sensors can be mounted next to the suction cups to provide feedback on whether the suction is successful or not, and thereby closing the loop. For additional views, FIG. 3C provides back, right, left, and front views (moving in a clockwise direction).

In accordance with various embodiments of the present disclosure, an exemplary robotic system includes the following aspects/features. First, embodiments of the system can include a framing multifunctional end effector 110 that enables a robotic arm to support the framing activities of walls and floors by nailing wood studs and installing wood studs and top/bottom tracks. Addition framing activities include performing paint/foam spraying of walls and floor panels and/or extendable 3D printing functions. Second, embodiments of the system can include an installation multifunctional end effector 120 that enables the installation of two-dimensional construction components, such as OSB sheathing, drywalls, doors, windows, etc. Addition installation activities supported by such an end effector may include performing paint/foam spraying of walls and floor panels and/or extendable 3D printing functions. Third, embodiments of the system include a robotic workstation that includes two multifunctional framing end effectors 110 mounted on two industrial robotic arms to frame wall and floor panels. Fourth, embodiments of the system include a robotic workstation having a multifunctional framing end effector 110 and a multifunctional installation end effector 120. Tasks that can be performed by this system may include the installation of two-dimensional construction components, such as OSB sheathing, drywalls, doors, windows, etc.); framing activities that may include nailing wood studs and installing top/bottom tracks; performing paint/foam spraying for wall and floor panels; and/or supporting extendable 3D printing functions. Such a workstation can include a control center 150 to test and manually manipulate the various attachments/functions of respective end effectors as needed.

Figure 4A:
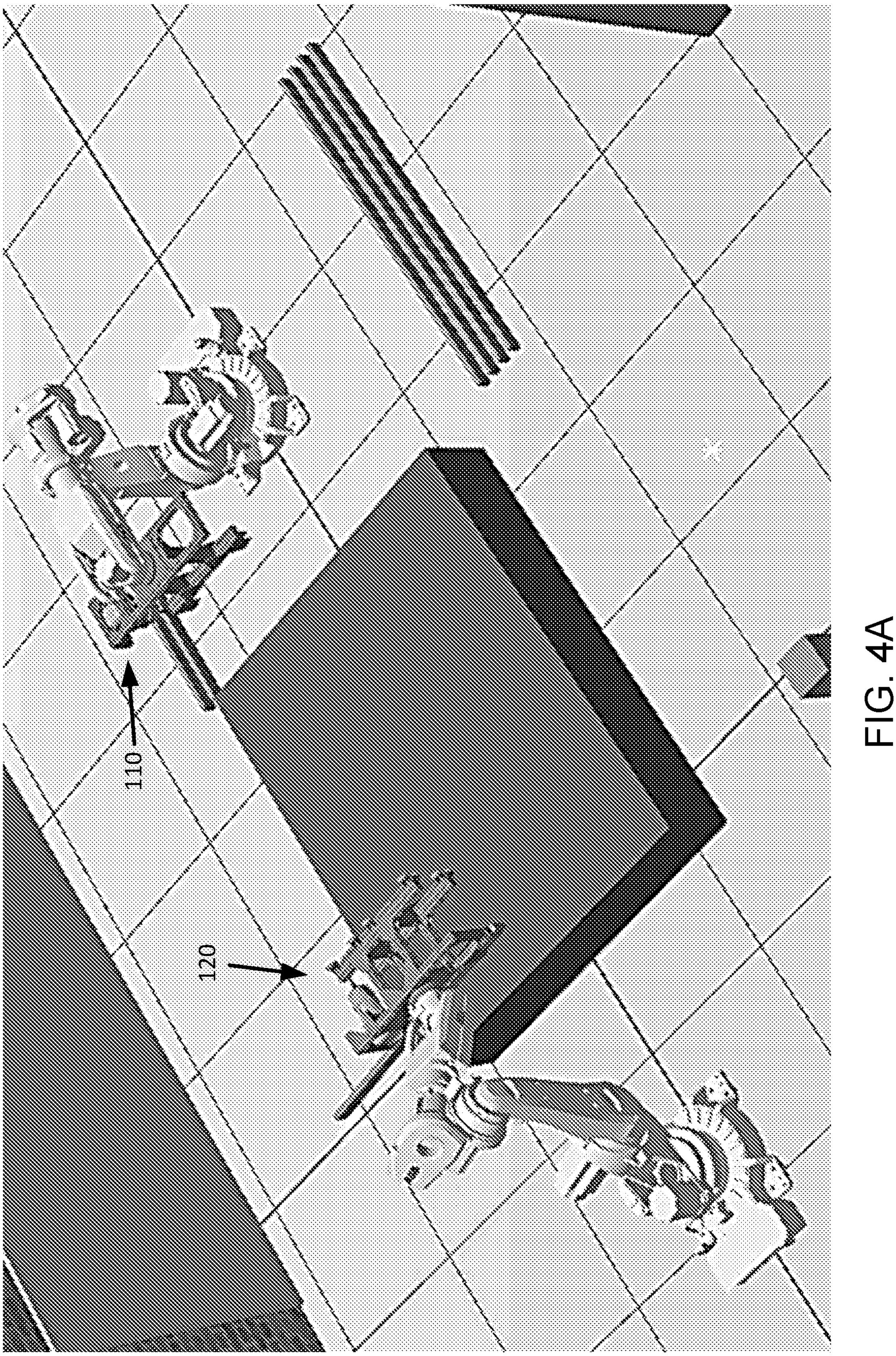
FIGS. 4A-4C demonstrate a computer simulation of an exemplary robotic workstation having a multifunctional framing end effector and a multifunctional installation end effector in accordance with various embodiments of the present disclosure.
Figure 4B:
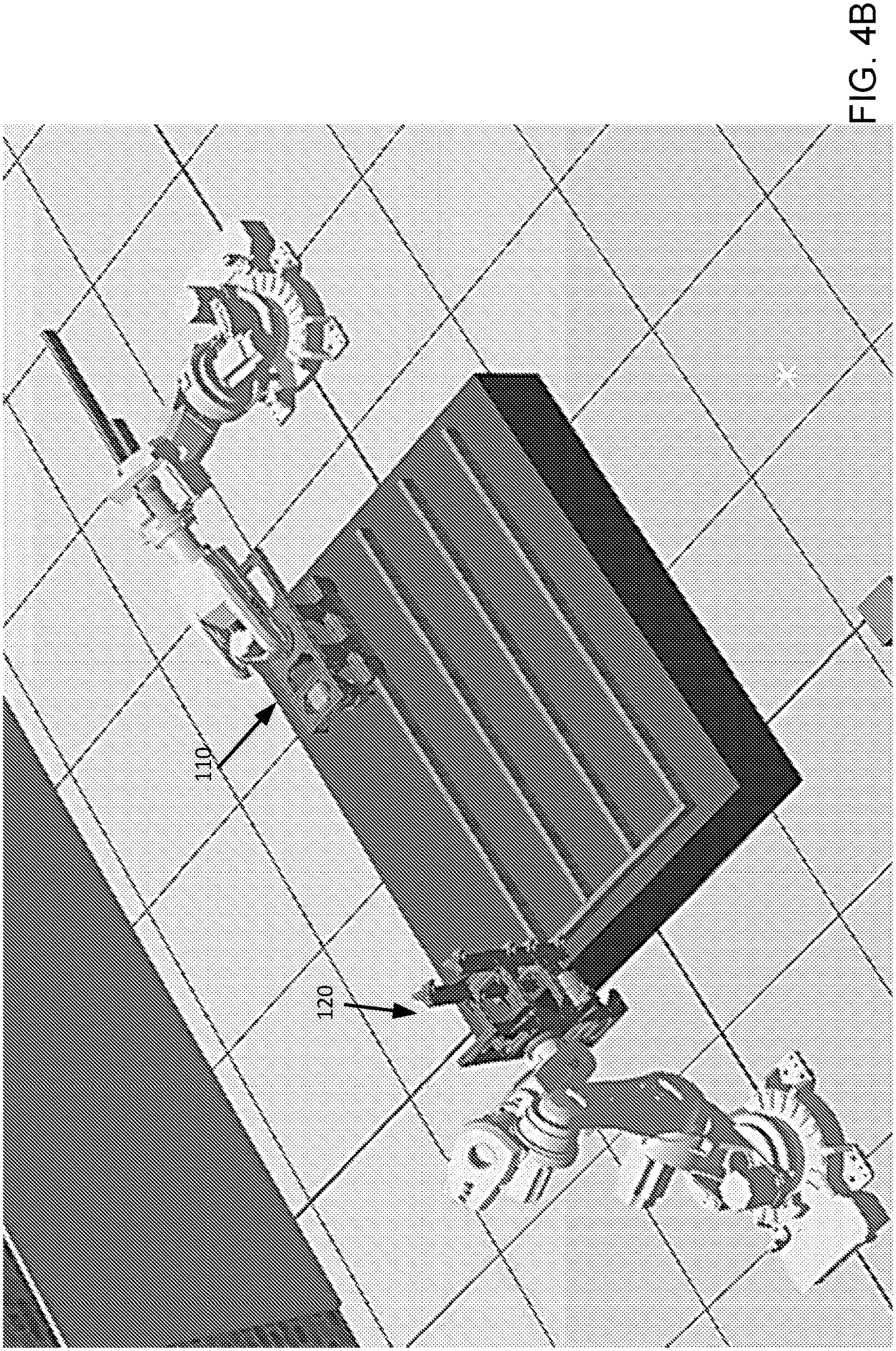
Figure 4C:
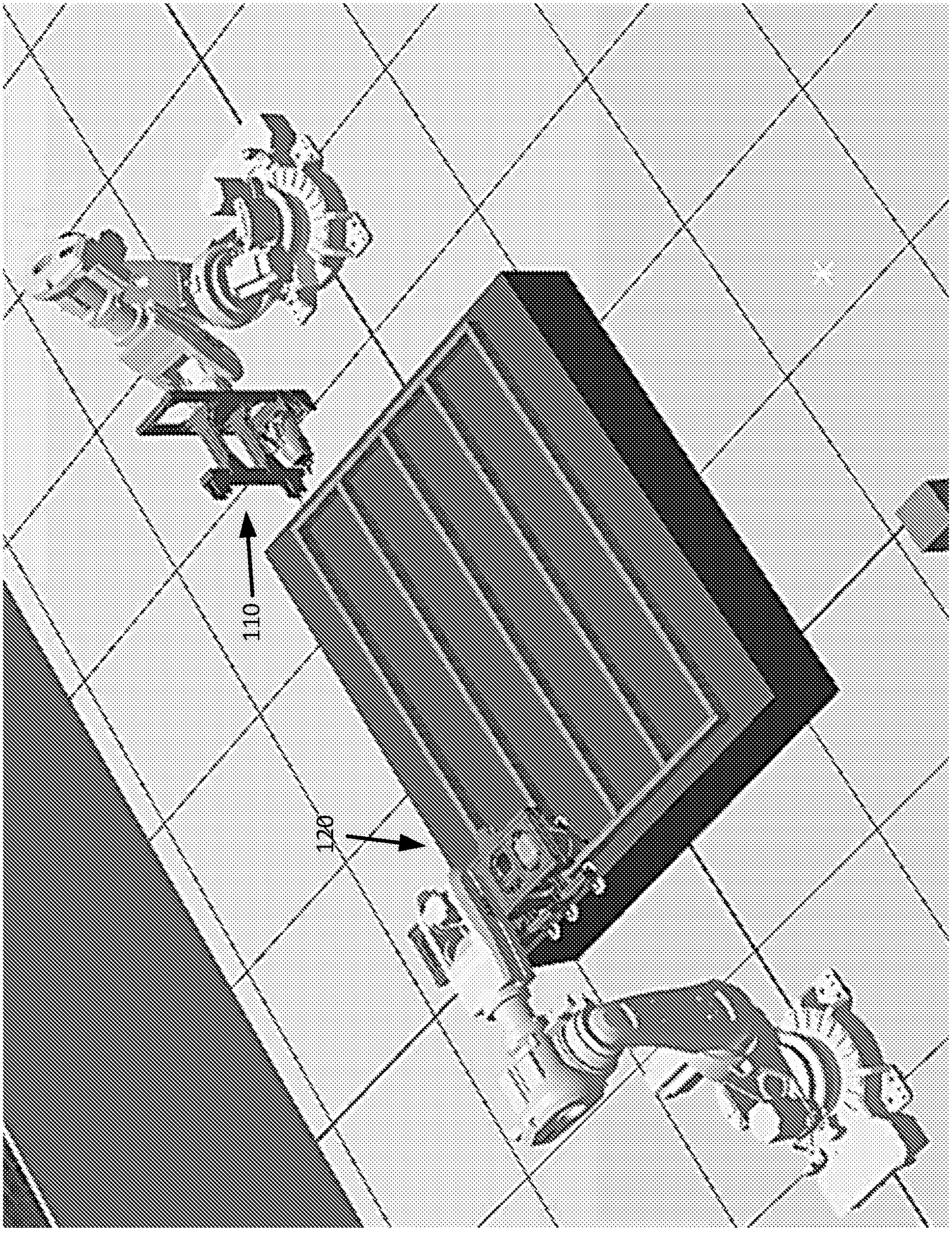

Referring now to FIGS. 4A-4C, an exemplary robotic workstation having a multifunctional framing end effector 110 and a multifunctional installation end effector 120 is demonstrated using computer simulation. In FIG. 4A, the robot equipped with the multifunctional framing end effector 110 is positioned on a right side of the figure and the robot equipped with the multifunctional installation end effector 120 is positioned on a left side of the figure. For this illustrative construction project, the robot with the installation multifunctional end effector 120 begins by positioning a first framing member (e.g., top plate) into position on a work surface, as illustrated in FIG. 4A, using its gripper elements 302. Next, as shown in FIG. 4B, the robot with the framing multifunctional end effector 110 positions additional framing members (e.g., studs) into an orthogonal position with respect to the first framing member, in which the robot with the installation multifunctional end effector

120 follows by respectively fastening the newly positioned additional framing member to the first framing member via its fastening gun component 304 after the additional frame member has been put into proper position by the opposing robot. Correspondingly, in FIG. 4C, the robot with the framing multifunctional end effector 110 positions a last framing member (e.g., bottom plate) into position and fastens the last framing member to the previously positioned additional framing members to form a wood frame construction using its fastening gun component 204. Additional construction operations may be performed including attaching paneling to the wood frame construction such that the suction cups of the installation multifunctional end effector 120 could then be utilized to move the paneled frame construction after completion, among other possible operations.

Figure 5A:
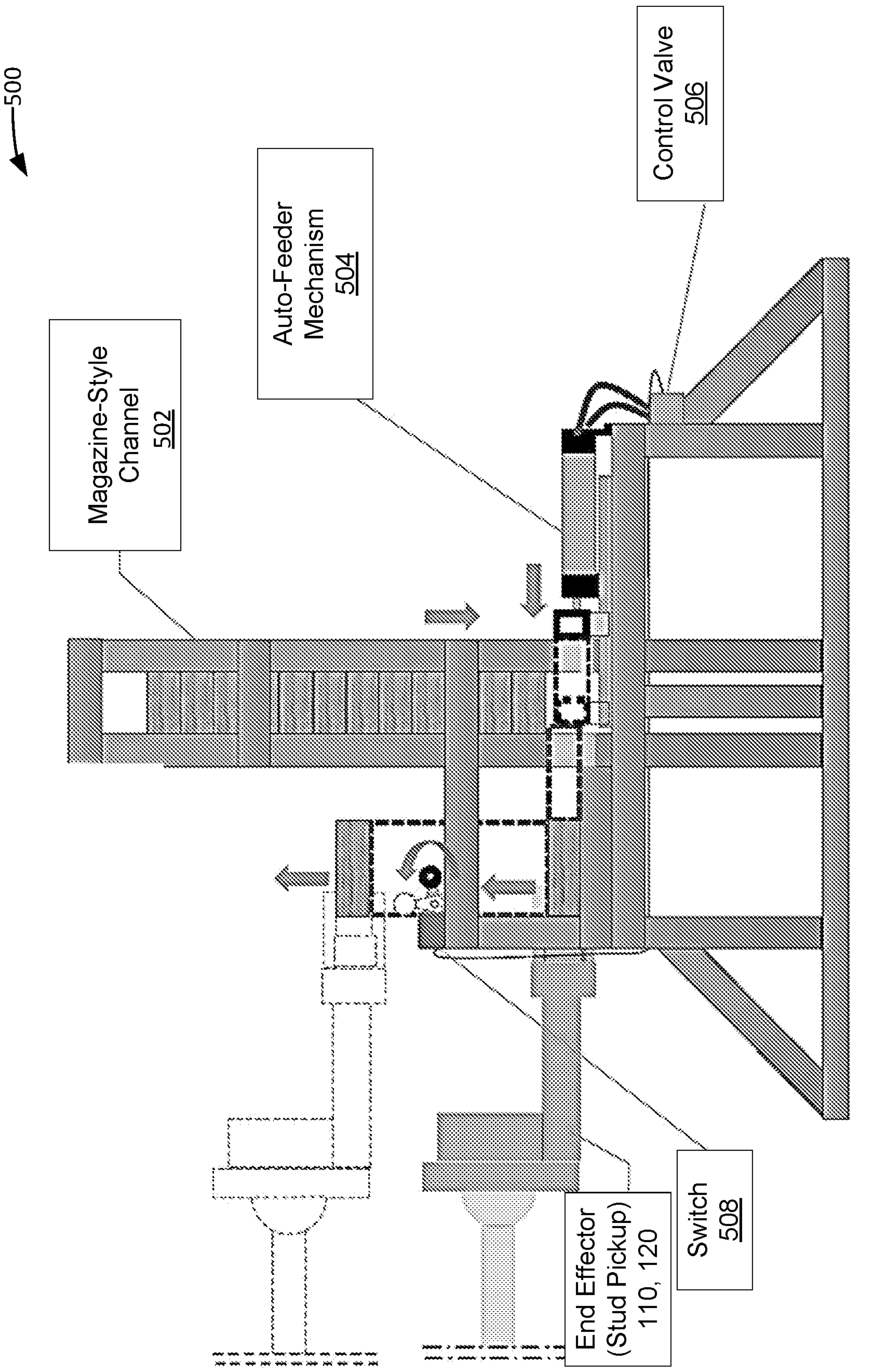
FIG. 5A illustrates a magazine style feeder mechanism that can facilitate loading and unloading of construction materials by robot systems in accordance with various embodiments of the present disclosure.

In various embodiments, to facilitate loading and unloading of construction materials by robot systems, a magazine style feeder mechanism 500 may be deployed, as shown in FIG. 5A. Here, a stack of work piece materials, such as wood/steel studs, can be stacked in a vertical chamber 502 where an auto-feeder mechanism 504 pushes the lower piece in the stack for pickup by the respective robot and end effector mechanism after the previous bottom piece in the stack has been picked up. In a non-limiting embodiment, one or more auto-feeder mechanisms 504 are used to feed the lower stud in the stack, where the auto-feeder mechanisms 504 are controlled via control valves 506 (e.g. pneumatic, hydraulic, or electric control valves). As such, the control valves 506 are activated automatically using an automatic switch 508 that is triggered when an end effector 110, 120 of a robot picks up the lower stud to install in a wall panel.

Figure 5B:
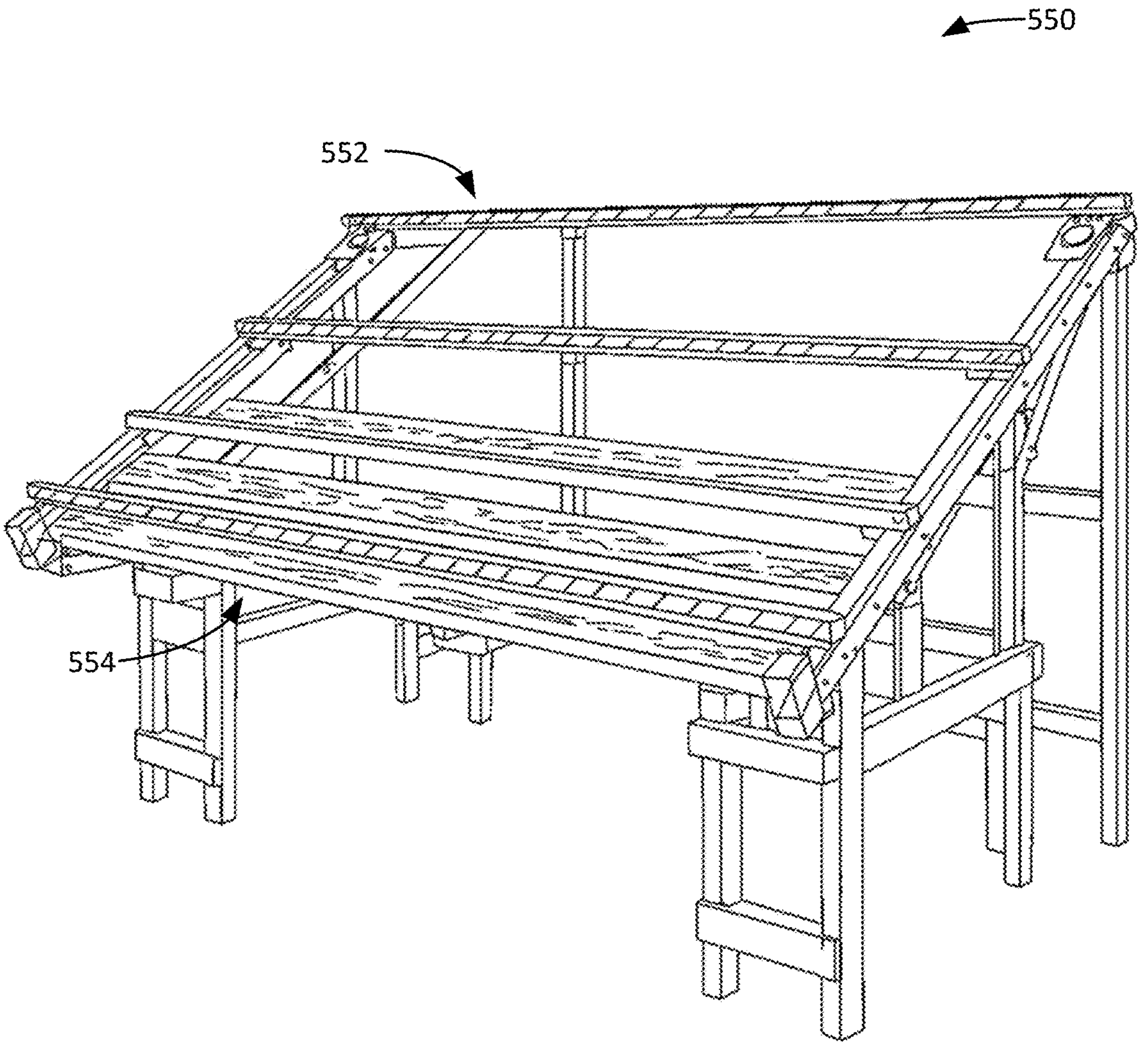
FIG. 5B is a line drawing of an alternative feeder mechanism that can be deployed that uses a slanted chamber as opposed to the vertical chamber of FIG. 5A.

Similarly, in various embodiments, an alternative feeder mechanism 550 can be deployed that uses a slanted chamber as shown in FIG. 5B (of a line drawing of a prototype assembly) as opposed to the vertical chamber of FIG. 5A. This type of arrangement may be appropriate for longer pieces of work materials, where the arrangement of FIG. 5A may be appropriate for shorter length materials. Here, a stack of work piece materials, such as wood/steel studs, can be arranged in a slanted chamber 552 where gravity acts to push the lower piece in the stack for pickup at a bottom portion 554 by the respective robot and end effector mechanism after the previous bottom piece in the stack has been picked up by a robot.

In various embodiments, an exemplary robotic system can be controlled by a computer control system 150 that utilizes artificial intelligence. In particular, the navigation system can be implemented using intelligent tools such as fuzzy logic, neural networks, and combinations thereof. An exemplary artificial intelligence control system acquires information from robot sensors (e.g., imaging, laser, etc.) and makes decisions regarding the next move of the robot arm. The advantage offered by the use of artificial intelligence is that the robot arm can move autonomously (or semi-autonomously with input for the operator) to allow for better coordination of the robotic system, accurate target control, operator support to assist complex operative maneuvers, increased safety of the operation, and decreased operative time. For example, construction operations and maneuvers can involve hazardous activities that require sensitive actions. Robotics is one of the technologies that has been identified as being a key to increase the efficiency of the operations and will transform the way construction projects can be prepared by minimizing the workload and intervention of human builders/operators. Autonomous behavior can be attained by equipping the robot with a software module that implements algorithms from artificial intelligence.

In various embodiments, such a computer control system 150 can feature a control interface that provides toggle settings for implementing a manual mode of operation, an automatic mode of operation, and/or a deactivated mode of operation. Accordingly, a prototype control interface for a first robot can have a framing multifunctional end effector mechanism 110 and a second robot having an installation multifunctional end effector mechanism 120, where the control interface allows for manual operation of the respective end effectors of robots by an operator, allows for automated operation of the respective end effectors of the robots by the computer control system 150, and deactivation of operations of the respective end effectors of the robots. Correspondingly, robotic arms can be controlled via their robotic control units, such as, but not limited to, an ABB IRC5—Industrial Robot Controller. The automated operation allows an intelligent algorithm (stored on a computer/server) to control both the robots and end-effectors by linking the control system to the robotic controller or to the computer/server linked to the robotic controller.

It should be emphasized that the above-described embodiments of the present disclosure are merely possible examples of implementations, merely set forth for a clear understanding of the principles of the disclosure. Many variations and modifications may be made to the above-described embodiment(s) without departing substantially from the principles of the disclosure. All such modifications and variations are intended to be included herein within the scope of this disclosure and protected by the following claims.

The invention claimed is:

1. A multifunctional end effector robotic system comprising:
- a mounting plate of a multifunctional end effector that is configured to couple to an arm of a robot;
- a plurality of functional components of the multifunctional end effector, the plurality of functional components comprising:
  - a work piece holding assembly that is configured to perform a clamping action or a suction action to a work piece;
  - a fastener gun component that is configured to attach a fastener to the work piece; and
  - a spray component that is configured to perform spraying or extruding of materials on the work piece; and
- a power control box of the multifunctional end effector that is configured to supply power to the plurality of functional components.

2. The multifunctional end effector robotic system of claim 1, wherein the fastener gun component comprises a nail gun or a screw gun.

3. The multifunctional end effector robotic system of claim 1, wherein the work piece holding assembly comprises a gripper assembly having at least two grippers that are configured to perform clamping actions to the work piece.

4. The multifunctional end effector robotic system of claim 3, wherein the fastener gun component of the multifunctional end effector is pointed in a same perpendicular direction as the at least two grippers of the gripper assembly of the multifunctional end effector, wherein the perpendicular direction is relative to the mounting plate.

5. The multifunctional end effector robotic system of claim 4, wherein the spray component is coupled to a linear actuator that is configured to extend the spray component in a same direction as the gripper assembly and the fastener gun component are pointed.

6. The multifunctional end effector robotic system of claim 1, wherein the work piece holding assembly comprises a suction cup assembly having a plurality of suction cups that are configured to hold and release the work piece by performing the suction action.

7. The multifunctional end effector robotic system of claim 6, wherein the fastener gun component of the multifunctional end effector is pointed in a same perpendicular direction as the suction cups of the suction cup assembly of the multifunctional end effector, wherein the perpendicular direction is relative to the mounting plate.

8. The multifunctional end effector robotic system of claim 7, wherein the spray component is coupled to a linear actuator that is configured to extend the spray component in a same direction as the suction cup assembly and the fastener gun component are pointed.

9. The multifunctional end effector robotic system of claim 6, further comprising a gripper assembly of the multifunctional end effector that is pointed in a perpendicular direction with respect to a direction that the suction cups of the suction cup assembly of the multifunctional end effector are pointed.

10. The multifunctional end effector robotic system of claim 1, wherein the fastener gun component is configured to be movable in an angular rotation with respect to an end of the multifunctional end effector.

11. The multifunctional end effector robotic system of claim 1, wherein the fastener gun component is coupled to one or more linear actuators that are configured to extend the fastener gun component in an axial direction away from an end of the multifunctional end effector.

12. The multifunctional end effector robotic system of claim 1, wherein the spray component is equipped to spray paint.

13. The multifunctional end effector robotic system of claim 1, wherein the spray component is equipped to perform 3D printing extrusion.

14. The multifunctional end effector robotic system of claim 1, wherein the spray component is equipped to spray foam materials.

15. The multifunctional end effector robotic system of claim 1, wherein the power control box comprises a pneumatic power control box, a hydraulic power control box, or an electric power control box.

16. The multifunctional end effector robotic system of claim 1, further comprising a computer control system that is configured to send control commands to the robot.

17. The multifunctional end effector robotic system of claim 16, wherein the computer control system comprises a control for toggling between automatic and manual control of the multifunctional end effector.

18. The multifunctional end effector robotic system of claim 16, further comprising a second robot equipped with the multifunctional end effector, wherein the computer control system is configured to send control commands for completing a construction project to the robot and the second robot.

19. The multifunctional end effector robotic system of claim 1, further comprising an automatic feeder mechanism to supply work piece materials to the robot.

20. A method comprising:

coupling a multifunctional end effector to an arm of a robot, wherein the multifunctional end effector equipped with a plurality of functional components comprising a work piece holding assembly, a fastener gun, and a spray component;

performing a clamping action or a suction action to a work piece using the work piece holding assembly of the multifunctional end effector;

attaching a fastener to the work piece using the fastener gun of the multifunctional end effector; and spraying or extruding of materials on the work piece using the spray component of the multifunctional end effector.

* * * * *